(12) United States Patent
Ohara

(10) Patent No.: US 10,507,625 B2
(45) Date of Patent: Dec. 17, 2019

(54) TIRE VULCANIZATION MOLD

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/327,023

(22) PCT Filed: Sep. 28, 2016

(86) PCT No.: PCT/JP2016/004383
§ 371 (c)(1),
(2) Date: Feb. 21, 2019

(87) PCT Pub. No.: WO2018/061054
PCT Pub. Date: Apr. 5, 2018

(65) Prior Publication Data
US 2019/0210311 A1    Jul. 11, 2019

(51) Int. Cl.
*B29D 30/06* (2006.01)
*B29D 30/72* (2006.01)

(52) U.S. Cl.
CPC .......... *B29D 30/0606* (2013.01); *B29D 30/72* (2013.01); *B29D 2030/0612* (2013.01); *B29D 2030/0617* (2013.01)

(58) Field of Classification Search
CPC ................ B29D 30/0606; B29D 30/72; B29D 2030/0612; B29D 2030/0617;
(Continued)

(56) References Cited

U.S. PATENT DOCUMENTS 2,296,016 A * 9/1942 Bostwick .............. B29C 33/424
425/28.1
5,382,402 A * 1/1995 Espie ...................... B29C 33/10
156/394.1
(Continued)

FOREIGN PATENT DOCUMENTS

JP           64-53816 A     3/1989
JP        2005-28592 A     2/2005
(Continued)

OTHER PUBLICATIONS

International Search Report dated Nov. 15, 2016, issued in counterpart application No. PCT/JP2016/004383 (2 pages).

*Primary Examiner* — James P Mackey
(74) *Attorney, Agent, or Firm* — Westerman, Hattori, Daniels & Adrian, LLP

(57) ABSTRACT

A tire vulcanization mold 10 of an embodiment includes an annular side mold 14 having a side molding surface 18 for molding a side wall portion T2. In a side mold body 15 of the side mold 14, an annular recess 20 is provided in the side molding surface 18 and a side ring 22 is fitted into the annular recess. The side ring 22 is mounted in the annular recess 20 such that a vent gap 30 for discharging air is formed between the side ring and the annular recess, on an opening portion side of the annular recess 20, and such that the side ring 22 is centered with respect to the side mold body 15 by a close contact fitting portion 28 in which the side ring and the annular recess are fitted without a gap therebetween, on a bottom portion side of the annular recess 20.

10 Claims, 5 Drawing Sheets

(58) Field of Classification Search
CPC . B29D 2030/726; B29C 33/10; B29C 33/126; B29C 33/306; B29C 33/424
See application file for complete search history.

(56) References Cited

U.S. PATENT DOCUMENTS

2007/0254056 A1   11/2007  Ogawa
2007/0259063 A1*  11/2007  Tanaka .................... B29C 33/10
                                                          425/36

FOREIGN PATENT DOCUMENTS

| JP | 2009-184276 A | 8/2009 |
| JP | 2011-73252 A | 4/2011 |
| JP | 2015-202649 A | 11/2015 |
| WO | 2005/115710 A1 | 12/2005 |
| WO | WO 2009/007790 * | 1/2009 |

\* cited by examiner

TIRE VULCANIZATION MOLD

TECHNICAL FIELD

An embodiment of the present invention relates to a tire vulcanization mold for vulcanization molding a tire.

BACKGROUND ART

The tire is manufactured by preparing an unvulcanized green tire and vulcanizing the green tire using the tire vulcanization mold while molding it into a predetermined shape. In the tire vulcanization mold, it is required to discharge air accumulated between the mold and the green tire in order to suppress molding defects.

For example, Patent Literature 1 discloses that a side mold for molding a sidewall portion of the tire is divided into a plurality of rings in a tire radial direction, and centering between the rings is performed by forming mating surfaces of each ring as inclined surfaces inclined with respect to a tire axial direction, so that gaps between the rings are made uniform in a tire circumferential direction. However, in this literature, the mating surfaces of the rings are closely fitted and centered, and grooves for discharging the air are provided in the mating surfaces. Therefore, rubber intrudes into the grooves for discharging the air, which causes a poor appearance. Further, this literature discloses as another mode that during manufacture of the mold, the mating surfaces of each ring are temporarily closely fitted and centered and a screw hole is formed for fixing both, and then, each ring is positioned in the tire axial direction using a shim, so that minute gaps for discharging the air are provided on the mating surfaces. However, in this case, since centering between the rings by close contact fit is not performed in a state finally assembled by using the shim, and centering is influenced by machining accuracy of screw holes, it is not easy to make uniform the minute gaps in the tire circumferential direction.

On the other hand, Patent Literatures 2 and 3 disclose that an annular recess is provided in the side mold and an annular ring member is fitted into the annular recess. However, a structure disclosed in Patent Literature 2 does not discharge the air from the gap between the ring member and the annular recess, but discharges the air by separately providing a recessed groove and a vent hole. The structure disclosed in Patent Literature 3 discharges the air from between the ring member and the annular recess, but discharges the air by providing a large number of fine grooves on the mating surfaces of the ring member and the annular recess, and there is a possibility that the rubber may intrude the fine grooves.

CITATION LIST

Patent Literature

Patent Literature 1: JP-A-2015-202649
Patent Literature 2: JP-A-2005-028592
Patent Literature 3: JP-A-64-053816

SUMMARY OF THE INVENTION

Technical Problem

In the case of providing the annular recess in the side mold body, fitting a side ring into the annular recess, and discharging the air by ensuring the gap in the mating surfaces of the both, if the side ring is not centered with respect to the side mold body, it is not possible to ensure a uniform vent gap in the tire circumferential direction. That is, when the side ring is mounted eccentrically, the vent gap is not uniform in the circumferential direction of the tire, and the rubber easily protrudes from a portion having a large gap. On the other hand, when the side ring is just tightly fitted into the annular recess for centering, it is not possible to provide the vent gap.

Embodiments of the present invention have been made in view of the above, and an object of the present invention is to provide the tire vulcanization mold capable of forming the uniform vent gap over an entire circumference in the tire circumferential direction in the side mold.

Means for Solving the Problems

An embodiment of the present invention is a tire vulcanization mold for vulcanization molding a tire, including an annular side mold having a side molding surface for molding a side wall portion of the tire. The side mold includes: a side mold body having an annular recess extending over an entire circumference in a tire circumferential direction provided on the side molding surface; and an annular side ring fitted into the annular recess and constituting a part of the side molding surface. The side ring is mounted in the annular recess such that a vent gap for discharging air is formed between a circumferential surface of the side ring and a wall surface of the annular recess facing the circumferential surface, on an opening portion side of the annular recess, and such that the side ring is centered with respect to the side mold body by a close contact fitting portion in which the side ring and the annular recess are fitted without a gap therebetween, on a bottom portion side of the annular recess.

In an embodiment, the close contact fitting portion may include a recess side inclined surface provided on the annular recess and inclined with respect to a tire axial direction, and a ring side inclined surface provided on the side ring and inclined in the same direction as the recess side inclined surface. Further, a groove extending in the tire circumferential direction may be provided along a boundary line between the side ring and the annular recess on the side molding surface. Furthermore, in an embodiment, the side molding surface of the side ring may be provided in a protruding shape with respect to the side molding surface of the side mold body on an inner peripheral side and an outer peripheral side thereof. In another embodiment, the side molding surface of the side ring may be provided in a recessed shape with respect to the side molding surface of the side mold body on an inner peripheral side and an outer peripheral side.

Advantage of the Invention

In the present embodiment, regarding the side ring fitted into the annular recess of the side mold body, since the vent gap is formed on the opening portion side of the annular recess, and the side ring is centered with respect to the side mold body by the close contact fitting portion on the bottom side, it is possible to form the uniform vent gap over the entire circumference in the tire circumferential direction. Therefore, it is possible to discharge the air while suppressing the rubber from sticking out.

MODE FOR CARRYING OUT THE INVENTION

Hereinafter, embodiments will be described with reference to the drawings.

Figure 1:
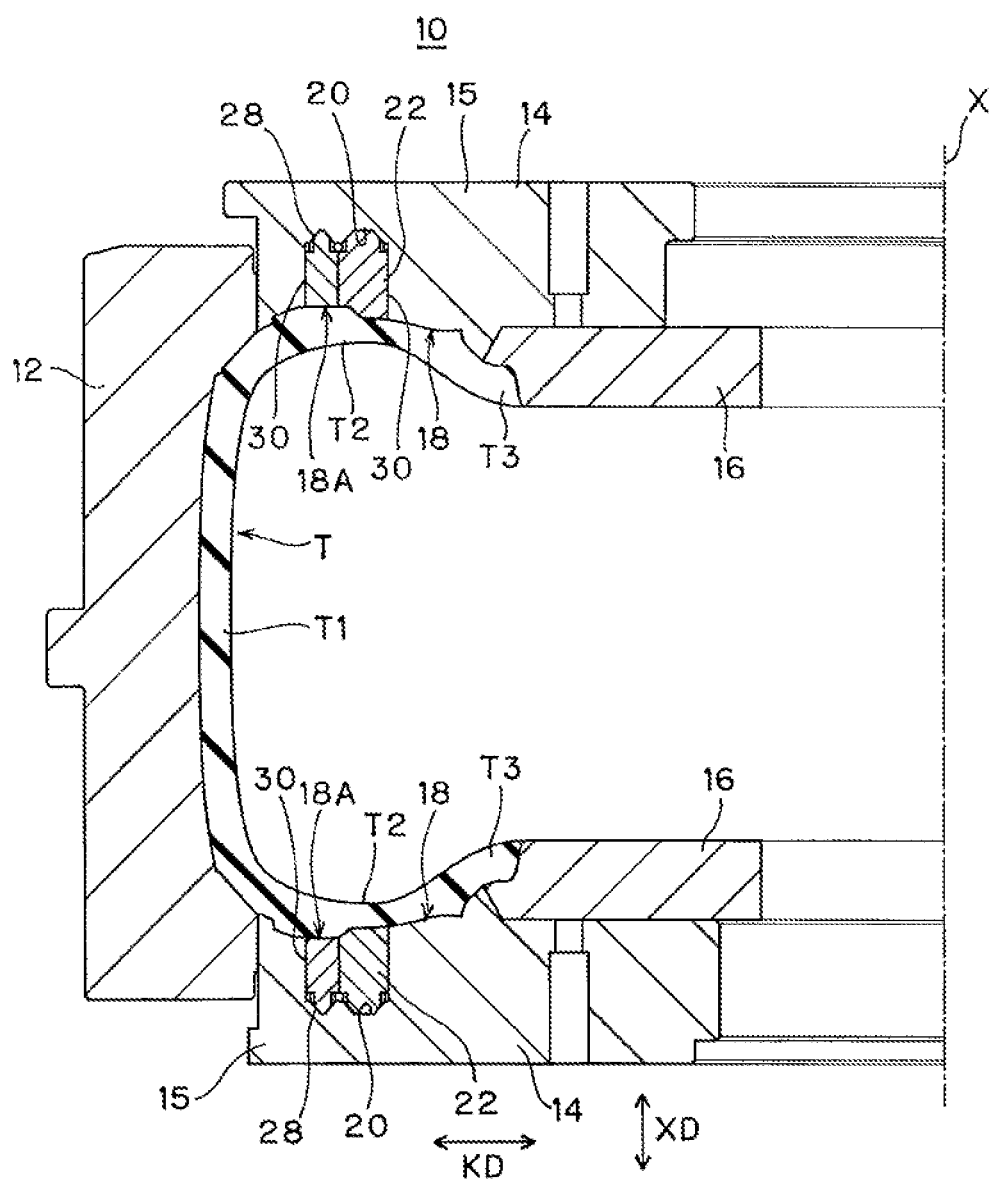
FIG. 1 is a half cross-sectional view showing a state of a tire vulcanization mold according to an embodiment at the time of vulcanization.

FIG. 1 is a view showing a tire vulcanization mold (hereinafter simply referred to as a vulcanization mold) 10 according to an embodiment, which is used for vulcanization molding a pneumatic tire T. The vulcanization mold 10 is a mold for vulcanization molding an unvulcanized green tire by setting its axial center X in a vertical direction, and includes a tread mold 12 for molding a tread portion T1 of the tire T, an upper and lower pair of side molds 14, 14 for molding side wall portions T2 of the tire T, and an upper and lower pair of bead rings 16, 16 for molding bead portions T3 of the tire T, to form a cavity which is a molding space of the tire T.

The tread mold 12 is an annular mold as a whole made up of a plurality of sectors divided in a tire circumferential direction, and the plurality of sectors are provided to be expandable, contractible, and displaceable in the tire radial direction. The upper and lower side molds 14, 14 are annular, more specifically, thick-walled hollow disc-shaped molds, and are respectively provided on an inner peripheral side at both end portions in a tire axial direction of the tread mold 12. The upper and lower bead rings 16, 16 are annular molds configured such that the bead portions T3 of the tire T are fitted therein, and are respectively provided on the inner peripheral side of the upper and lower side molds 14, 14.

Figure 2:
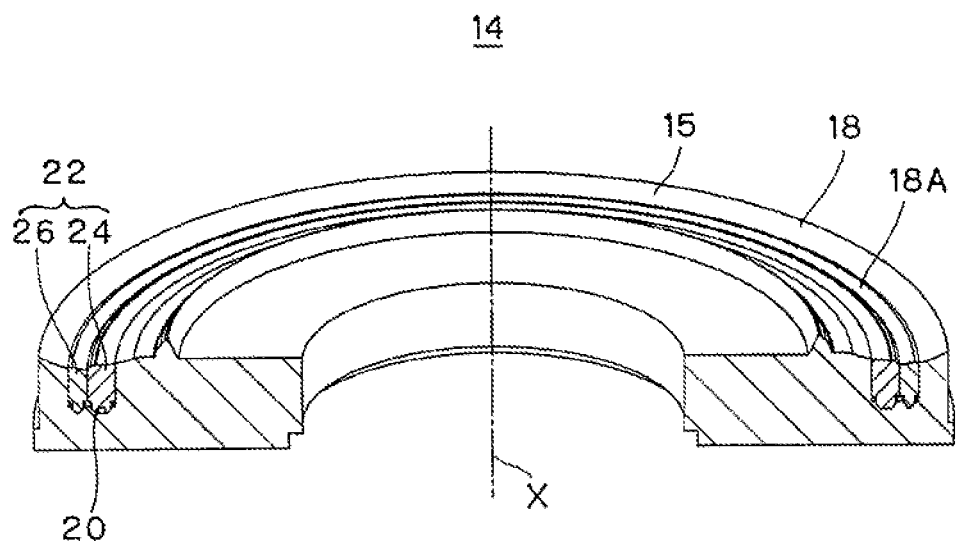
FIG. 2 is a half-cut perspective view of a side mold in the embodiment.

As shown in FIGS. 1 and 2, the side mold 14 has a side molding surface 18 for molding a side wall portion T2, and includes a side mold body 15 and a side ring 22.

The side mold body 15 has an annular recess 20 provided in the side molding surface 18. The annular recess 20 is a recessed groove extending over an entire circumference in the tire circumferential direction, and has a circular shape in a plan view centered on an axis X (the same as an axis of the side mold 14 and the vulcanization mold 10) of the tire T The side ring 22 is an annular member fitted into the annular recess 20 and constituting a part 18A of the side molding surface 18. In this example, the side molding surface 18A constituted by the side ring 22 is set near the maximum width position (that is, a position protruding curved most outward in the tire width direction except protrusion such as a pattern in the side wall portion T2) of the tire T.

Figure 3:
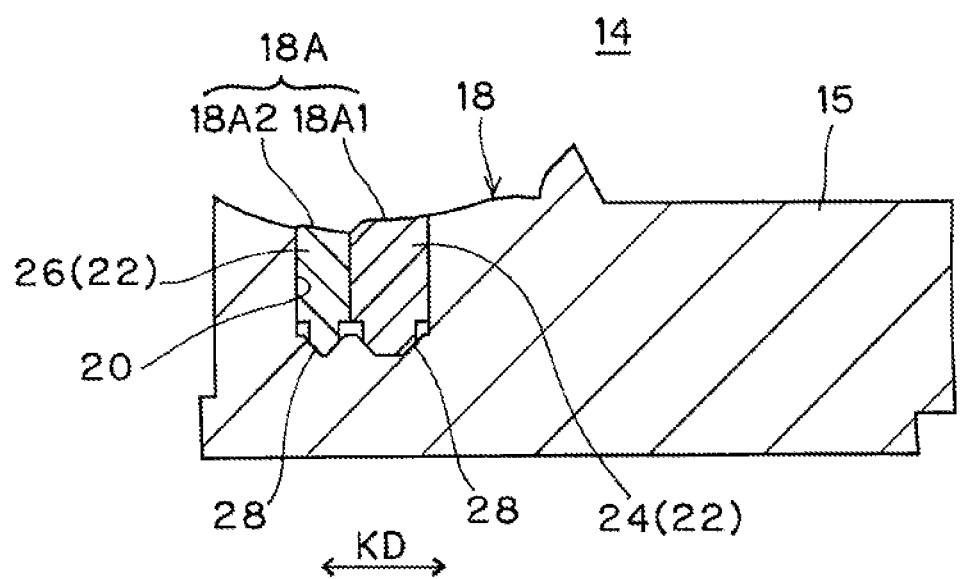
FIG. 3 is a cross-sectional view of the side mold.

As shown in FIG. 3, the side ring 22 is mounted in the annular recess 20 in a state where the side ring 22 is centered with respect to the side mold body 15 by a close contact fitting portion 28 in which the side ring 22 and the annular recess 20 are fitted without a gap therebetween, on a bottom portion side (that is, a deep side) of the annular recess 20. That is, the fitting portion 28 like a so-called spigot and socket joint is provided at a bottom portion of the annular recess 20 and a tip end portion of the side ring 22 corresponding to the bottom portion, so that both are positioned in a tire radial direction KD. Therefore, the side ring 22 is centered with respect to the side mold body 15 (that is, centers of the both are aligned with each other) by the close contact fitting portion 28. Then, in this centered state, the side ring 22 is fixed to the side mold body 15 by a bolt (not shown).

Figure 4A:
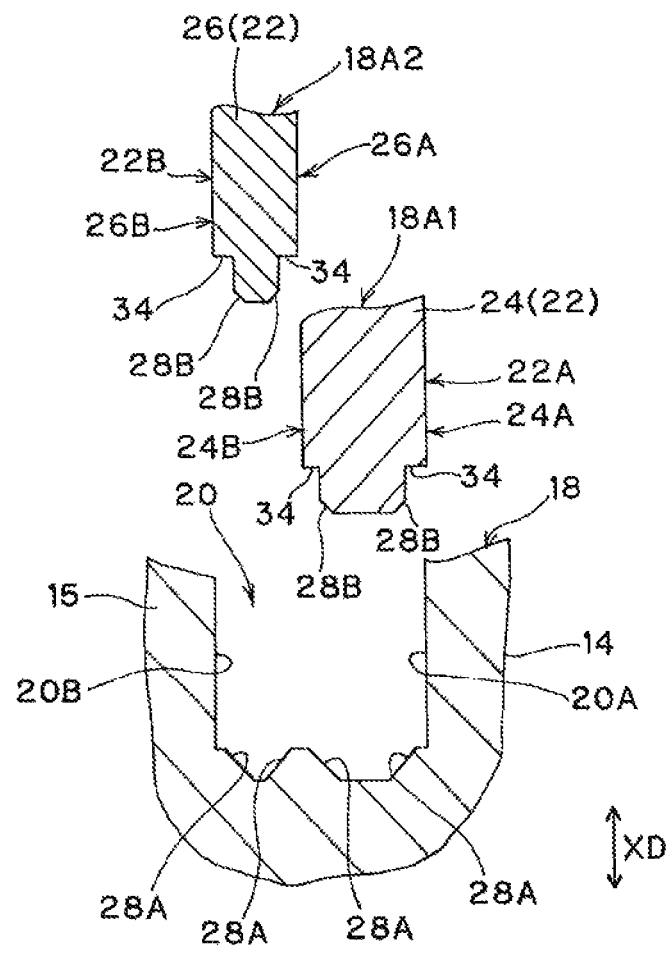
FIG. 4(a) is an enlarged exploded cross-sectional view of a main part of the side mold.
Figure 4B:
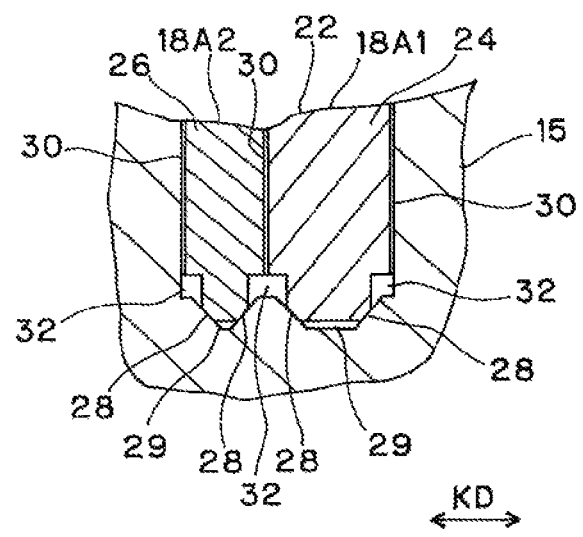
FIG. 4(b) is a cross-sectional view showing an assembled state of the side mold.

As shown in FIGS. 4(a) and 4(b), the close contact fitting portion 28 includes a recess side inclined surface 28A provided on the annular recess 20 and inclined with respect to a tire axial direction XD, and a ring side inclined surface 28B provided in the the side ring 22 and inclined in the same direction (that is, parallel to each other) as the recess side inclined surface 28A. Both of the inclined surfaces 28A and 28B are inclined circumferential surfaces extending in the tire circumferential direction. Therefore, the recess side inclined surface 28A and the ring side inclined surface 28B are closely fitted to each other around the entire circumference in the circumferential direction of the tire without a gap therebetween, whereby centering of the side ring 22 with respect to the side mold body 15 is performed.

More specifically, in this example, the side ring 22 has a shape of an inner and outer double ring, that is, includes an annular first ring 24 having a first molding surface 18A1 and an annular second ring 26 having a second molding surface 18A2 adjacent to an outer peripheral side of the first molding surface 18A1. The close contact fitting portion 28 is provided in each of the first ring 24 and the second ring 26, and the first ring 24 and the second ring 26 are respectively centered with respect to the side mold body 15. As shown in FIGS. 4(a) and 4(b), the ring side inclined surfaces 28B and 28B are respectively provided on the inner peripheral side and the outer peripheral side in each tip end portion of the first ring 24 and the second ring 26, and they are inclined with respect to the tire axial direction XD so as to approach each other as they go downward. Further, in the annular recess 20, for each of the first ring 24 and the second ring 26, the recess side inclined surfaces 28A and 28A on the inner peripheral side and the outer peripheral side are provided to receive the ring side inclined surfaces 28B and 28B on the inner peripheral side and the outer peripheral side, and they are inclined with respect to the tire axial direction XD so as to approach each other as they go to the bottom portion side. Note that a gap 29 is provided between a lower surface of the side ring 22 and a bottom surface of the annular recess 20.

The side ring 22 is mounted in the annular recess 20 so as to form vent gaps 30 for discharging air between circumferential surfaces of the side ring 22 and wall surfaces of the annular recess 20 facing the circumferential surfaces, on an opening portion side (that is, the opening portion side from the close contact fitting portion 28) of the annular recess 20. That is, minute gaps 30 for discharging the air are provided between an inner circumferential surface 22A of the side ring 22 and an inner wall surface 20A of the annular recess 20, and between an outer circumferential surface 22B of the side ring 22 and an outer wall surface 20B of the annular recess 20, while the wall surfaces 20A and 20B respectively face the circumferential surfaces 22A and 22B. The vent gaps 30 are provided along boundary lines between the side ring 22 and the annular recess 20 over the entire circumference in the tire circumferential direction. The vent gap 30 is a gap for discharging the air trapped between the side molding surface 18 and the green tire, and is set to such a dimension that the air passes therethrough but unvulcanized rubber does not intrude thereinto. Specifically, it is preferably a gap of 0.05 mm or less, and may be a gap of 0.01 to 0.05 mm or a gap of 0.01 to 0.03 mm.

More specifically, in this example, the vent gap 30 is provided in a wide range including a central portion from the opening portion in a depth direction of the annular recess 20. As described above, the vent gap 30 may be provided in a wider range including the opening portion as long as it is provided on the opening portion side of the annular recess 20.

Further, in this example, since the side ring 22 is composed of the first ring 24 and the second ring 26, the vent gap 30 is also provided between the first ring 24 and the second ring 26, that is, the vent gaps 30 are respectively provided between an inner circumferential surface 24A of the first ring 24 and the inner wall surface 20A of the annular recess 20, between the outer circumferential surface 24B of the first ring 24 and the inner circumferential surface 26A of the second ring 26, and between the outer circumferential surface 26B of the second ring 26 and the outer wall surface 20B of the annular recess 20.

In the annular recess 20, vent paths 32 extending in the tire circumferential direction are provided between the vent gaps 30 and the close contact fitting portions 28. The vent paths 32 are respectively provided for the vent gaps 30, and in this example, as shown in FIGS. 4(a) and 4(b), they are formed by providing cutouts 34 extending in the circumferential direction in the side ring 22. The vent paths 32 are configured to discharge the air to the outside of the vulcanization mold 10 through a vent channel (not shown).

When the pneumatic tire T is manufactured using the vulcanization mold 10 prepared as described above, the green tire (unvulcanized tire) is set in the vulcanization mold 10 and the mold is closed, and then by inflating a bladder (not shown) disposed on the inside, the green tire is pressed against an inner surface of the mold and kept in a heated state, so that the green tire is vulcanization molded. At that time, the air accumulated between the green tire and the side mold 14 is discharged to the outside through the vent gaps 30 formed between the side mold body 15 and the side ring 22.

In the present embodiment, the side ring 22 fitted into the annular recess 20 of the side mold 14 forms the vent gaps 30 at least in the opening portion of the annular recess 20, while the side ring 22 is centered with respect to the side mold body 15 by the close contact fitting portion 28 in the bottom portion side from the vent gaps 30. That is, the side ring 22 is fitted into the annular recess 20 without being eccentric, and in this state, the vent gaps 30 are formed on mating surfaces between the side ring 22 and the annular recess 20. Therefore, since the vent gaps 30 are formed as uniform minute gaps over the entire circumference in the circumferential direction of the tire, it is possible to discharge the air while suppressing the rubber from sticking out.

Further, in the present embodiment, since the close contact fitting portion 28 is formed by fitting the recess side inclined surface 28A and the ring side inclined surface 28B to each other, centering precision is high and the dimension of the vent gap 30 can be easily set.

In the present embodiment, since the side ring 22 has a double ring shape, and the vent gaps 30 are formed not only at a boundary portion between the side ring 22 and the annular recess 20 but also between the first ring 24 and the second ring 26, venting performance can be improved. The side ring 22 is not limited to such an inner and outer double ring shape, but may be constituted by a single ring or divided into a plurality of triple or more.

It should be noted that the close contact fitting portion 28 may not necessarily be provided all around, as long as the side ring 22 can be centered with respect to the side mold body 15. However, it is preferable to provide it all around in view of processability. Further, it is not limited to a case in which venting structures by the side rings 22 are provided in both of the upper and lower side molds 14, 14, but may be applied to only one side mold.

Figure 5:
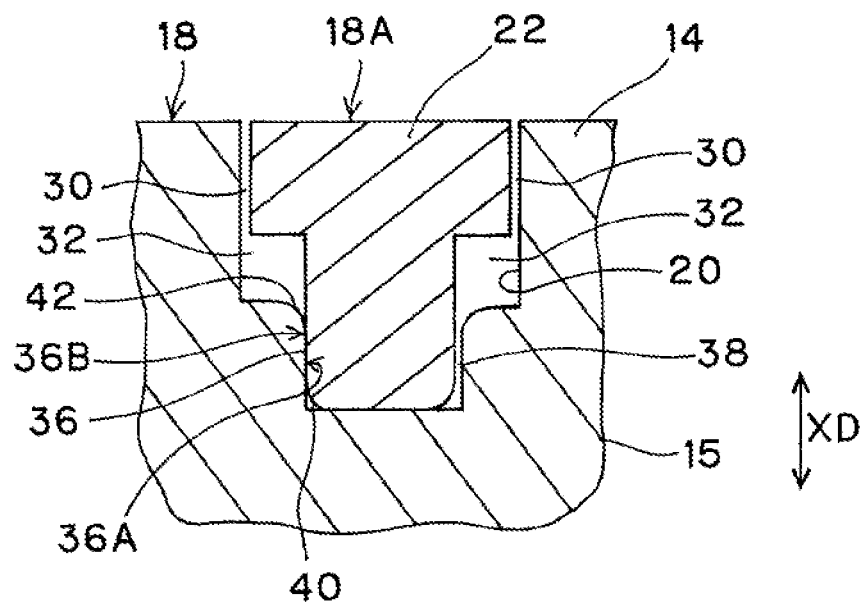
FIG. 5 is an enlarged cross-sectional view of the main part of the side mold according to another embodiment.

FIG. 5 is an enlarged cross-sectional view of a main part of the side mold 14 according to a second embodiment. In the first embodiment shown in FIGS. 1 to 4, the close contact fitting portion 28 for centering the side ring 22 is constituted by inclined surfaces, however, in the second embodiment, the side ring 22 is centered by a close contact fitting portion 36 provided not inclined but in parallel with the tire axial direction XD, which is different from the first embodiment. Further, in the second embodiment, the side ring 22 is constituted by the single ring, which is also different from the first embodiment.

The close contact fitting portion 36 of the second embodiment is constituted by a recess side circumferential surface 36A provided in the annular recess 20 and parallel to the tire axial direction XD and a ring side circumferential surface 36B provided on the side ring 22 and parallel to the tire axial direction XD. In this example, the recess side circumferential surface 36A is formed by projecting a bottom portion of the outer wall surface of the annular recess 20 to an inner diameter side, and the ring side circumferential surface 36B is formed by the outer circumferential surface at the tip end portion of the side ring 22. Therefore, the close contact fitting portion 36 is formed only on the outer circumferential side of the side ring 22, and a gap 38 is provided on the inner circumferential side. The side ring 22 is centered with respect to the side mold body 15 by closely fitting the recess side circumferential surface 36A and the ring side circumferential surface 36B to each other without a gap therebetween.

In order to smoothly guide the ring side circumferential surface 36B of the side ring 22 into the recess side circumferential surface 36A of the annular recess 20, an outer circumferential edge portion 40 of the tip end portion of the side ring 22 is formed in a rounded cross-sectional curved shape, and an opening end portion 42 of the recess side circumferential surface 36A of the annular recess 20 is also formed in a rounded cross-sectional curved shape.

As described above, the close contact fitting portion for centering between the side ring 22 and the annular recess 20 is not limited to a structure with the inclined surfaces, but fitting of the surfaces parallel to the tire axial direction XD is also applicable. Further, in the case where the close contact fitting portions 28 and 36 are provided over the entire tire circumferential direction, it is not necessary to provide them on both the inner circumferential side and the outer circumferential side of the side ring 22, but the side ring 22 can be centered by either of the close contact fitting portions. Other structures and operational effects of the second embodiment are the same as those of the first embodiment, and description thereof will be omitted.

Figure 6:
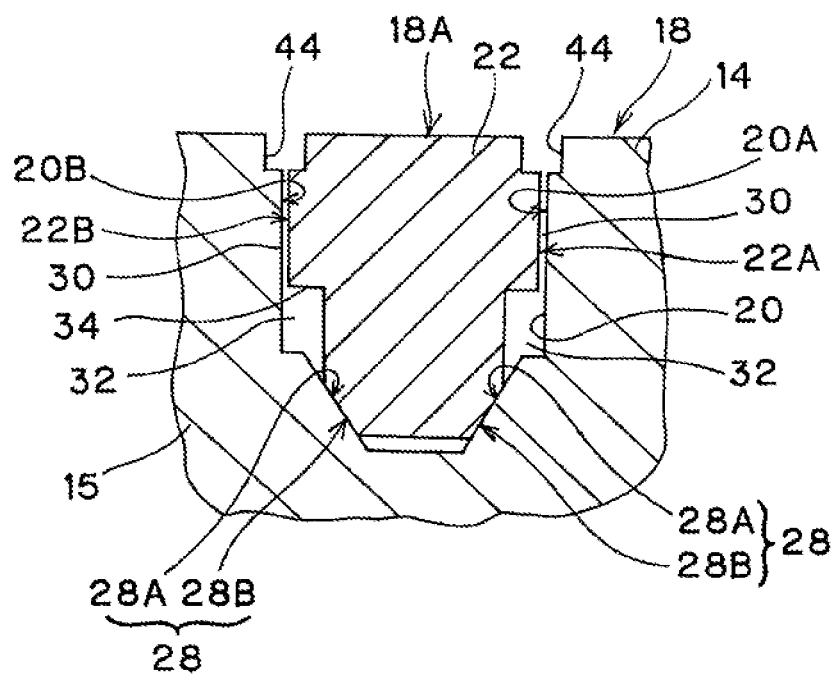
FIG. 6 is an enlarged cross-sectional view of the main part of the side mold according to still another embodiment.

FIG. 6 is an enlarged cross-sectional view of the main part of the side mold 14 according to a third embodiment. The third embodiment is different from the first embodiment in that the side ring 22 is made of a single ring, and grooves 44 extending in the tire circumferential direction are provided along the boundary lines between the side ring 22 and the annular recess 20 in the side molding surface 18.

Specifically, in the third embodiment, the side ring 22 made of a single ring is fitted into the annular recess 20, and a pair of inner and outer recess side inclined surfaces 28A, 28A provided at the bottom of the annular recess 20, and a pair of inner and outer ring side inclined surfaces 28B, 28B provided at the tip end portion of the side ring 22 are respectively fitted to each other without a gap therebetween to form a close contact fitting portion 28, so that the side ring 22 is centered with respect to the side mold main body 15. Further, the vent gaps 30 are formed on the opening portion side of the annular recess 20, and the vent gaps 30 are formed between the inner circumferential surface 22A of the side ring 22 and the inner wall surface 20A, and between the outer circumferential surface 22B of the side ring 22 and the outer wall surface 20B, while the inner wall surface 20A and the outer wall surface 20B respectively face the inner circumferential surface 22A and the outer circumferential surface 22B.

The grooves 44 extending in the tire circumferential direction are respectively provided along the boundary lines with the annular recess 20 on the inner circumferential side and the outer circumferential side of the side ring 22. That is, the grooves 44 are provided over the entire circumference in the tire circumferential direction so as to overlap the vent gaps 30.

By providing such grooves 44, the venting performance from the vent gaps 30 can be improved. Further, by providing the grooves 44, an annular protrusion is formed on the sidewall portion of the tire, but this protrusion may be made to function as a design to improve designability. Other configurations and operational effects of the third embodiment are the same as those of the first embodiment, and a description thereof will be omitted.

Figure 7:
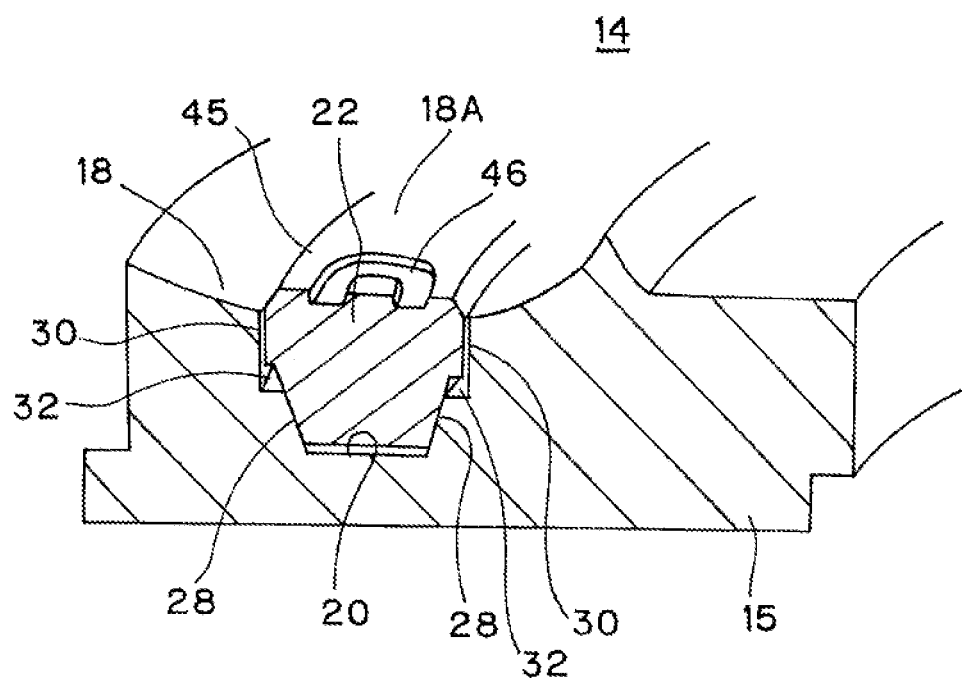
FIG. 7 is an enlarged perspective cross-sectional view of the main part of the side mold according to still another embodiment.

FIG. 7 is an enlarged perspective cross-sectional view of the main part of the side mold 14 according to a fourth embodiment. The fourth embodiment is different from the first embodiment in that the side ring 22 is constituted by the single ring similarly to the third embodiment, and the side molding surface 18A of the side ring 22 is provided in a raised shape with respect to the side molding surface 18 of the side mold body 15 on the inner circumferential side and the outer circumferential side thereof.

In detail, in the fourth embodiment, the side ring 22 fitted into the annular recess 20 is formed such that the side molding surface 18A is raised in a trapezoidal shape with respect to the side molding surface 18 on the inner circumferential side and the outer circumferential side thereof, and a table 45 protruding from the surface of the side mold body 15 is formed over the entire circumference in the tire circumferential direction. On the surface of the table 45 which is the raised side molding surface 18A, a mark 46 such as letters, symbols, figures and the like is formed in a recessed shape. Thus, since a strip-shaped and tray-shaped recess extending over the entire circumference in the tire circumferential direction and the mark raised in the tray-shaped recess are formed in the sidewall portion of the vulcanization-molded tire, designability can be improved. Other structures and operational effects of the fourth embodiment are the same as those of the first embodiment, and description thereof will be omitted.

Figure 8:
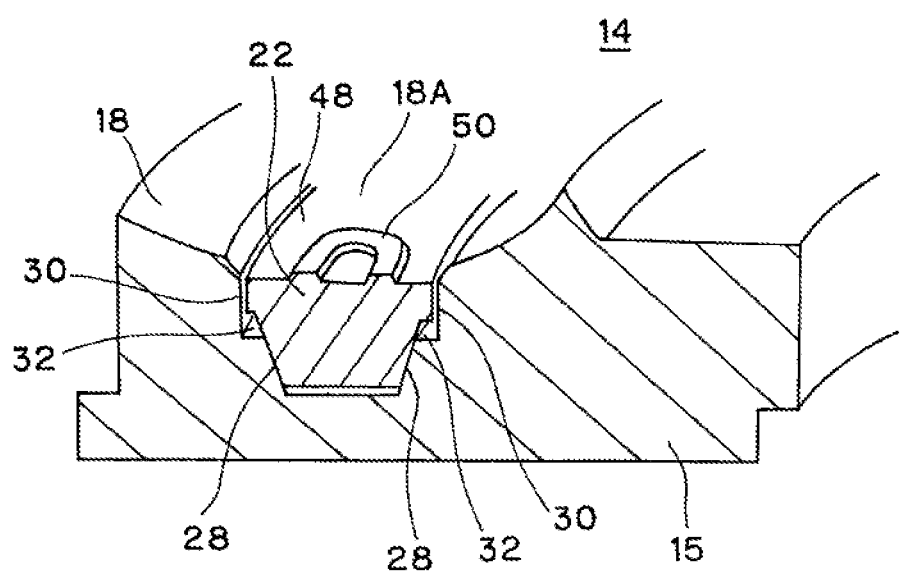
FIG. 8 is an enlarged perspective cross-sectional view of the main part of the side mold according to still another embodiment

FIG. 8 is an enlarged perspective cross-sectional view of the main part of the side mold 14 according to the fifth embodiment. The fifth embodiment is different from the fourth embodiment in that the side molding surface 18A of the side ring 22 is provided in a recessed shape with respect to the side molding surface 18 of the side mold body 15 on the inner circumferential side and the outer circumferential side thereof.

Specifically, in the fifth embodiment, the side ring 22 fitted into the annular recess 20 is formed such that the side molding surface 18A is recessed in a tray shape with respect to the side molding surface 18 on the inner circumferential side and the outer circumferential side thereof, and a tray-shaped recess 48 recessed from the surface of the side mold body 15 is formed over the entire circumference in the tire circumferential direction. On the surface of the tray-shaped recess 48 which is the recessed side molding surface 18A, a mark 50 such as letters, symbols, figures and the like is formed in a raised shape. Thus, since a strip-shaped trapezoidal protrusion extending over the entire circumference in the tire circumferential direction and the mark recessed on the surface of the trapezoidal protrusion are formed in the sidewall portion of the vulcanization-molded tire, designability can be improved. Further, since the side molding surface 18A of the side ring 22 is recessed from the surrounding side molding surface 18, the venting performance from the vent gap 30 can be improved. Other structures and operational effects of the fifth embodiment are the same as those of the first embodiment, and description thereof will be omitted.

Although several embodiments have been described above, these embodiments have been presented by way of example and are not intended to limit the scope of the invention. These novel embodiments can be implemented in various other forms, and various omissions, substitutions, and changes can be made without departing from the scope of the invention.

DESCRIPTION OF REFERENCE NUMERALS AND SIGNS

T: pneumatic tire, T2: side wall portion, 10: tire vulcanization mold, 14: side mold, 15: side mold body, 18: side molding surface, 20: annular recess, 22: side ring, 28: close contact fitting portion, 18A: recess side inclined surface, 28B: ring side inclined surface, 30: vent gap, 36: close contact fitting portion.

The invention claimed is:

1. A tire vulcanization mold for vulcanization molding a tire, comprising
an annular side mold having a side molding surface for molding a side wall portion of the tire, wherein
the side mold comprises:
a side mold body having an annular recess extending over an entire circumference in a tire circumferential direction provided on the side molding surface; and
an annular side ring fitted into the annular recess and constituting a part of the side molding surface, and
the side ring is mounted in the annular recess such that a vent gap for discharging air is formed between a circumferential surface of the side ring and a wall surface of the annular recess facing the circumferential surface, on an opening portion side of the annular recess, and such that the side ring is centered with respect to the side mold by a close contact fitting portion in which the side ring and the annular recess are fitted without a gap therebetween, on a bottom portion side of the annular recess.

2. The tire vulcanization mold according to claim 1, wherein the close contact fitting portion comprises: a recess side inclined surface provided on the annular recess and inclined with respect to a tire axial direction; and a ring side inclined surface provided on the side ring and inclined in the same direction as the recess side inclined surface.

3. The tire vulcanization mold according to claim 1, wherein a groove extending in the tire circumferential direction is provided along a boundary line between the side ring and the annular recess on the side molding surface.

4. The tire vulcanization mold according to claim 1, wherein the side molding surface of the side ring is provided in a protruding shape with respect to the side molding surface of the side mold body on an inner peripheral side and an outer peripheral side.

5. The tire vulcanization mold according to claim 1, wherein the side molding surface of the side ring is provided in a recessed shape with respect to the side molding surface of the side mold body on an inner peripheral side and an outer peripheral side.

6. The tire vulcanization mold according to claim 2, wherein a groove extending in the tire circumferential direction is provided along a boundary line between the side ring and the annular recess on the side molding surface.

7. The tire vulcanization mold according to claim 2, wherein the side molding surface of the side ring is provided in a protruding shape with respect to the side molding surface of the side mold body on an inner peripheral side and an outer peripheral side.

8. The tire vulcanization mold according to claim 2, wherein the side molding surface of the side ring is provided in a recessed shape with respect to the side molding surface of the side mold body on an inner peripheral side and an outer peripheral side.

9. The tire vulcanization mold according to claim 3, wherein the side molding surface of the side ring is provided in a protruding shape with respect to the side molding surface of the side mold body on an inner peripheral side and an outer peripheral side.

10. The tire vulcanization mold according to claim 3, wherein the side molding surface of the side ring is provided in a recessed shape with respect to the side molding surface of the side mold body on an inner peripheral side and an outer peripheral side.

\* \* \* \* \*